United States Patent
Fuhrmann et al.

(10) Patent No.: US 12,241,489 B2
(45) Date of Patent: Mar. 4, 2025

(54) PNEUMATIC DEVICE WITH SEALING MEANS AND METHOD THEREFOR

(71) Applicant: ZF CV Systems Europe BV, Brussels (BE)

(72) Inventors: Ingo Fuhrmann, Langenhagen (DE); Karl-Heinz Riediger-Janisch, Hannover (DE); Jan Weinacht, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 157 days.

(21) Appl. No.: 17/915,254

(22) PCT Filed: Mar. 29, 2021

(86) PCT No.: PCT/EP2021/058145
§ 371 (c)(1),
(2) Date: Sep. 28, 2022

(87) PCT Pub. No.: WO2021/198174
PCT Pub. Date: Oct. 7, 2021

(65) Prior Publication Data
US 2023/0125466 A1 Apr. 27, 2023

(30) Foreign Application Priority Data
Mar. 30, 2020 (DE) .................... 10 2020 108 757.8

(51) Int. Cl.
*F15B 21/044* (2019.01)
*B60T 17/00* (2006.01)
(Continued)

(52) U.S. Cl.
CPC .......... *F15B 21/044* (2013.01); *B60T 17/002* (2013.01); *F16K 24/046* (2013.01); *F16K 31/22* (2013.01)

(58) Field of Classification Search
CPC ............ F15B 21/044; F15B 2211/8855; B60T 17/002; B60T 17/004; F16K 24/046; F16K 31/22
See application file for complete search history.

(56) References Cited

U.S. PATENT DOCUMENTS

| 1,851,084 | A | 3/1932 | Brown et al. |
| 6,009,898 | A | 1/2000 | Risch et al. |
| 2007/0125231 | A1* | 6/2007 | Thomas ................ B60T 17/008 55/385.4 |

FOREIGN PATENT DOCUMENTS

| DE | 1000253 B | 1/1957 |
| DE | 2829290 A1 | 1/1980 |

(Continued)

OTHER PUBLICATIONS

European Patent Office, Rijswijk, Netherlands, International Search Report of International Application No. PCT/EP2021/058145, Mailed Jul. 19, 2021, 2 pgs.

*Primary Examiner* — Atif H Chaudry
(74) *Attorney, Agent, or Firm* — Dickinson Wright PLLC

(57) ABSTRACT

A pneumatic device (1) has at least one venting path (10) for venting the pneumatic device (1) in an outflow direction (R1). The venting path (10) includes a first volume (12), through which a flow can pass, a first compressed-air passage (14), and a sealing mechanism (18). The first compressed-air passage (14) pneumatically connects the first volume (12) to a pressurized part (16) of the pneumatic device (1). The sealing mechanism (18) changes between a normal state (Z1) and a sealing state (Z2). In the normal state (Z1) a flow can pass through the first compressed-air passage (14) both in the outflow direction (R1) and in an oppositely directed inflow direction (R2). In the sealing state (Z2) a flow can pass through the first compressed-air passage (14) only in the outflow direction (R1).

26 Claims, 4 Drawing Sheets

(51) Int. Cl.
    *F16K 24/04*         (2006.01)
    *F16K 31/22*         (2006.01)

(56) References Cited

FOREIGN PATENT DOCUMENTS

| | | | | |
|---|---|---|---|---|
| DE | 2910086 | A1 | 9/1980 | |
| DE | 3534932 | A1 | 4/1987 | |
| DE | 202007003646 | U1 * | 10/2007 | ............... E03F 5/08 |
| DE | 102016011032 | A1 | 3/2018 | |
| DE | 102018209751 | A1 | 12/2019 | |
| EP | 1386810 | A1 | 2/2004 | |
| EP | 2345816 | A2 | 7/2011 | |
| GB | 2401330 | A | 11/2004 | |
| WO | 0015958 | A1 | 3/2000 | |

\* cited by examiner

PNEUMATIC DEVICE WITH SEALING MEANS AND METHOD THEREFOR

FIELD

The present disclosure relates to a pneumatic device having at least one venting path for venting the pneumatic device, wherein the venting path of the pneumatic device includes a sealing mechanism that is designed to change at least between a normal state and a sealing state, and to a method for installing a pneumatic device, which method includes arranging a sealing mechanism in a first compressed-air passage of the pneumatic device.

The present disclosure relates further to a method for preventing fluid from entering a pressurized portion of a pneumatic device, which method includes bringing a sealing mechanism from a normal state into a sealing state, and to the use of a ball for establishing a sealing state of a pneumatic device.

The pneumatic devices mentioned above are in particular pneumatic brake systems for vehicles, in particular for commercial vehicles, or brake valves and/or relay valves therefor.

BACKGROUND

Pneumatic devices, in particular pneumatic brake systems for vehicles, in particular for commercial vehicles, or brake valves and/or relay valves therefor, are frequently used in environments in which various foreign media can be present. In particular pneumatic brake systems and their components, such as relay valves, can be exposed to water from their environment, for example during cleaning, during operation in or after rain, in the event of floods, or when deliberately wading through water.

Pneumatic devices of the type described above typically have pneumatic connections with an external environment of the pneumatic device, for example in order to vent excess pressure from a pressurized portion of the pneumatic device, or in order to perform a pressure equalization with the environment of the pneumatic device. However, such a pneumatic connection with the environment of the pneumatic device can allow the ingress of foreign media present in the environment into the pneumatic device. In particular the ingress of fluids, for example water, can impair the functionality of the pneumatic device. Thus, in the case of pneumatic brake systems, the ingress of foreign media, in particular of water, can lead to corrosion or, for example as a result of the freezing of water, to a complete failure of the brake system. Measures must therefore be taken to impede or ideally to prevent the undesired ingress of foreign media.

Pneumatic devices with sealing means which are to impede the undesired ingress of small amounts of spray, or water, below a certain level are known from the prior art. Inter alia, GB 2 401 330 A, DE 10 2016 011 032 A1 and DE 28 29 290 A1 disclose such pneumatic devices.

SUMMARY

The object of the present invention is to permit the reliable operation of a pneumatic device of the type described above even in environments in which large amounts of a foreign medium, in particular water, are present.

In a first aspect, the object is achieved by a pneumatic device having at least one venting path for venting the pneumatic device in an outflow direction, wherein the venting path comprises a first volume, through which a flow can pass, a first compressed-air passage, and a sealing mechanism. The first compressed-air passage pneumatically connects the first volume to a pressurized portion of the pneumatic device. The sealing mechanism is designed to change at least between a normal state and a sealing state.

When the pneumatic device is vented, compressed air is guided from the pressurized part of the pneumatic device through the first compressed-air passage into the first volume, through which a flow can pass. Optionally, the compressed air can be guided from the first volume, through which a flow can pass, to an environment of the pneumatic device. In preferred embodiments, the pneumatic device comprises a second compressed-air passage which pneumatically connects the first volume to the environment. The venting process is typically driven by an excess pressure which prevails in the pressurized part of the pneumatic device compared to the first volume and/or the environment. The outflow direction is defined along the described flow path by the outflowing compressed air through the venting path, starting from the pressurized part, through the first compressed-air passage to the first volume, and optionally to the environment of the pneumatic device.

The inflow direction is opposite to the outflow direction and extends along the venting path, starting from the first volume, through the first compressed-air passage, to the pressurized part of the pneumatic device. Optionally, the inflow direction extends starting from the environment, through the first volume, the first compressed-air passage, and to the pressurized part of the pneumatic device.

In the normal state, a flow can pass through the first compressed-air passage both in the outflow direction and in the inflow direction. It can thus advantageously remain possible that a slight pressure equalization which may be desired can take place from higher pressure in the first volume and/or the environment to the pressurized part of the pneumatic device along the inflow direction. In any case, the normal state permits unimpeded venting in the outflow direction.

In the sealing state, a flow can pass through the first compressed-air passage only in the outflow direction but not in the inflow direction. In other words, the sealing mechanism in the sealing state performs the function of a one-way or check valve and preferably forms such a valve. The undesired ingress of foreign media into the pressurized part of the pneumatic device in the inflow direction can thereby be prevented.

In normal operation of the pneumatic device, which is present, for example, when the environmental conditions exclude with sufficient probability the ingress of foreign medium from the first volume and/or from the environment into the pressurized part of the pneumatic device, the sealing mechanism is in the normal state. A flow can pass freely through the first compressed-air passage. For example, an advantageous pressure equalization in the inflow direction can thus be possible, as described above.

Only in a special operating state, in which, for example, the ingress of foreign medium from the first volume and/or from the environment into the pressurized part is expected, does the sealing mechanism change into the sealing state. As described above, this allows venting of the pneumatic device to be continued but prevents the undesired ingress of foreign medium into the pressurized part of the pneumatic device.

In a preferred embodiment, the sealing mechanism is designed to change from the normal state into the sealing state when a foreign medium, in particular a fluid, in the first volume exceeds a threshold value. The threshold value can be so determined that the presence of foreign medium at or below the threshold value defines normal operation of the pneumatic device, and the presence of foreign medium above the threshold value defines the special operating state. For example, the threshold value can be a height of a fluid column present in the first volume. It can thus be possible to ensure that the sealing mechanism reliably changes into the sealing state in the special operating state. In one aspect, the foreign medium is, in particular, water. In the present disclosure, the term water is to be understood as meaning also aqueous fluid and mixed fluids which contain water predominantly or in a large part, for example mud, moor water, or bog water.

The sealing mechanism is preferably arranged in the first compressed-air passage. It is further preferred that the sealing mechanism comprises a sealing member and a seal seat, wherein the sealing member is designed to abut the seal seat in a sealing manner in the sealing state. In particular, the sealing member is designed to be capable of floating on water. However, it will also be appreciated that a sealing member according to the present invention can also be capable of floating on gaseous foreign media. Preferably, the sealing member has a mean density of 900 kg/m$^3$ or less, of 800 kg/m$^3$ or less, of 700 kg/m$^3$ or less, particularly preferably of 600 kg/m$^3$ or less. The mean density of the sealing member can suitably be adjusted when the ingress of foreign media other than water is to be prevented. If the sealing member is capable of floating on water or another foreign medium, that is to say its mean density is less than that of water or the other foreign medium, exceeding of the threshold value by the foreign medium can advantageously lead to the resulting buoyant force pressing the sealing member against the seal seat.

The seal seat or a portion thereof preferably has, downstream in the outflow direction, a normal which has at least one component which is parallel to and aligned with the outflow direction in the region of the sealing mechanism. In other words, the scalar product of that normal and the outflow direction in the region of the sealing mechanism is greater than zero. It is further preferred that the sealing member is arranged downstream of the seal seat in the outflow direction.

In a preferred embodiment, the sealing member is movable between a first position and a second position, wherein the sealing member occupies the first position in the normal state and the second position in the sealing state. In the first position, the sealing member abuts the seal seat in a sealing manner and thus forms, together with the seal seat, a check valve. In the second position, the sealing member does not abut the seal seat, so that a flow can pass through a region between the sealing member and the seal seat. In particular, the first position is downstream of the second position in the outflow direction.

The sealing mechanism preferably further has a guide for the sealing member, so that the sealing member is movable between the first and second positions along the guide. In particular, the guide defines for the sealing member a direction of movement between the first and second positions which is preferably parallel to the outflow direction at least in some portions. It is further preferred that the seal seat is provided at an end of the guide that is situated upstream in the outflow direction. The seal seat is preferably formed integrally thereon.

It is likewise preferred that the guide has, at an end situated downstream in the outflow direction, a stop which is designed to prevent the sealing member from coming out of the guide. The seal seat, the sealing member, and the guide can thus preferably form a structural unit which can be installed or retrofitted in existing pneumatic devices as a separate sealing mechanism. In particular, the sealing mechanism is a ball and the guide is a ball cage. The ball preferably has a closed cavity. The mean density of the ball is thereby reduced compared to the density of the material of which a shell of the ball is made, in particular so that the ball has a mean density which is lower than the density of the foreign medium. In alternative embodiments, the sealing member is a cylinder, a disk, a cone, a truncated cone, or an ellipsoid, wherein such an alternative sealing member preferably likewise has a closed cavity.

In a preferred embodiment, the ball cage has a plurality of guide bars extending in the outflow direction. It is further preferred that the first compressed-air passage is channel-shaped, that is to say a cross-section of the first compressed-air passage has dimensions which are smaller than the length of the compressed-air passage defined in the outflow direction.

It is preferred that the pneumatic device is designed so that the first compressed-air passage is arranged vertically at least in some portions in an installation situation of the pneumatic device. For example, floating of the sealing member on the foreign medium and a resulting movement of the sealing member from the first position into the second position can thus be assisted. It is likewise preferred that the pressurized portion of the pneumatic device is arranged above the first volume in an installation situation of the pneumatic device. An installation situation of the pneumatic device can in particular include installation in a vehicle or in a building.

In particularly preferred embodiments, the pneumatic device is a pneumatic brake system, in particular for a vehicle or a commercial vehicle. It is likewise preferred that the pneumatic device is a brake valve and/or relay valve, in particular a relay valve or a pneumatic or electropneumatic module of such a brake system. In alternative embodiments, the pneumatic device is a pressure-generating system, for example a compressor.

It will be appreciated that the pneumatic device according to the first aspect of the present disclosure and the further aspects of the present disclosure described in the following text can have the same features, especially features which are described as identical, and similar features. Furthermore, the further aspects of the present disclosure can have the same and similar sub-aspects as the first aspect of the present disclosure. In this respect, reference is made to the preceding description in its entirety for the further features of the following aspects and sub-aspects and the advantages thereof.

In a second aspect of the present disclosure, the object mentioned above is achieved by a method for preventing fluid from entering a pressurized part of a pneumatic device in an inflow direction. The method comprises providing fluid above a threshold value in a first volume of the pneumatic device and bringing a sealing mechanism from a normal state into a sealing state.

In a preferred embodiment of the method, the fluid brings the sealing mechanism into the sealing state by exceeding the threshold value. In particular, this is made possible, as described in relation to the first aspect of the invention, in that a buoyant force acts on the sealing mechanism. The fluid is preferably water.

It is preferred that the method further comprises venting the pressurized portion of the pneumatic device in the outflow direction.

In a third aspect of the invention, the object mentioned at the beginning is achieved in that a method for installing a pneumatic device is provided. The method comprises arranging a sealing mechanism in a first compressed-air passage of the pneumatic device, wherein the first compressed-air passage pneumatically connects a first volume of the pneumatic device and a pressurized portion of the pneumatic device. The sealing mechanism is designed to be able to change at least between a normal state and a sealing state. In particular, such an installation method can be advantageous when an existing pneumatic device is to be retrofitted with a sealing mechanism, in particular with a sealing mechanism described in relation to the first aspect of the invention.

In a fourth aspect of the invention, the object mentioned above is achieved in that a ball is used to establish a sealing state of a pneumatic device, starting from a normal state of the pneumatic device, wherein the sealing state prevents fluid from entering a pressurized portion of the pneumatic device.

Further features, advantages and sub-aspects of the above-described aspects of the present disclosure will become apparent from the following description of the figures, which show preferred embodiments of the invention. It will be appreciated that the features disclosed in the figures and the associated description of the figures and also in the claims and the preceding description can be essential to the further development of the invention both individually and in any desired combination. It will likewise be appreciated that a feature which is cited in an independent claim is not necessarily essential to the invention. Only the features that contribute, individually or in combination, to achieving the above-mentioned object are essential to the invention.

DETAILED DESCRIPTION

In the following text, the first, second, third, and fourth aspects of the present disclosure will be explained in relation to an exemplary embodiment, shown in particular in FIGS. 1 and 2, of a pneumatic device according to the first aspect of the disclosure. As will be apparent from the following description, the pneumatic device shown is suitable for, but not limited to, carrying out a method according to the second and/or fourth aspect of the disclosure and/or being installed by way of a method according to the third aspect of the disclosure. It will be appreciated that the features and advantages described in connection with FIGS. 1-4 are applicable to all the aspects and sub-aspects of the disclosure which have been described above.

Figure 1:
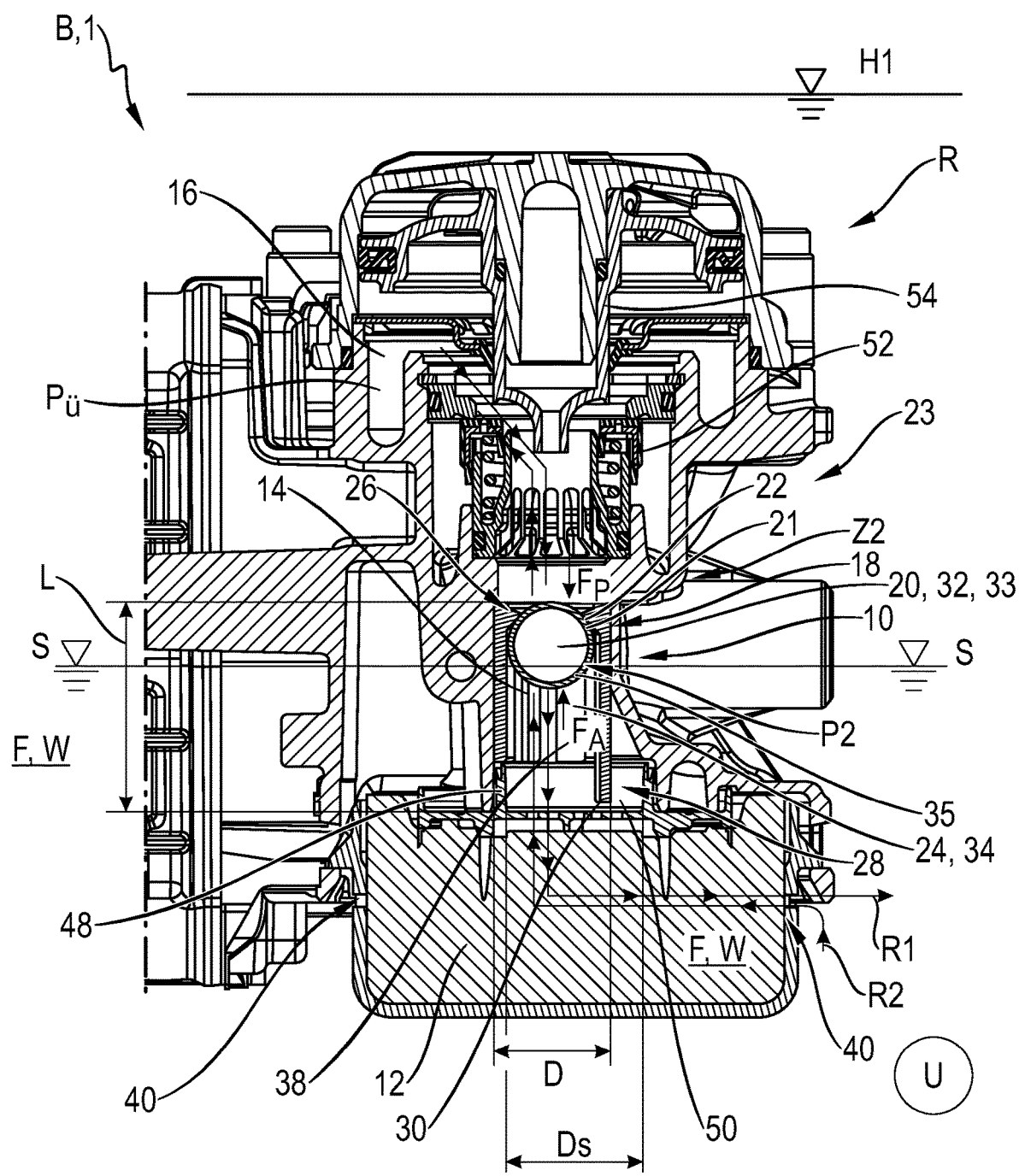
FIG. 1 shows a cross-section through a pneumatic device of an exemplary embodiment according to an aspect of the disclosure, wherein a sealing member is arranged in a second position and a sealing state.
Figure 2:
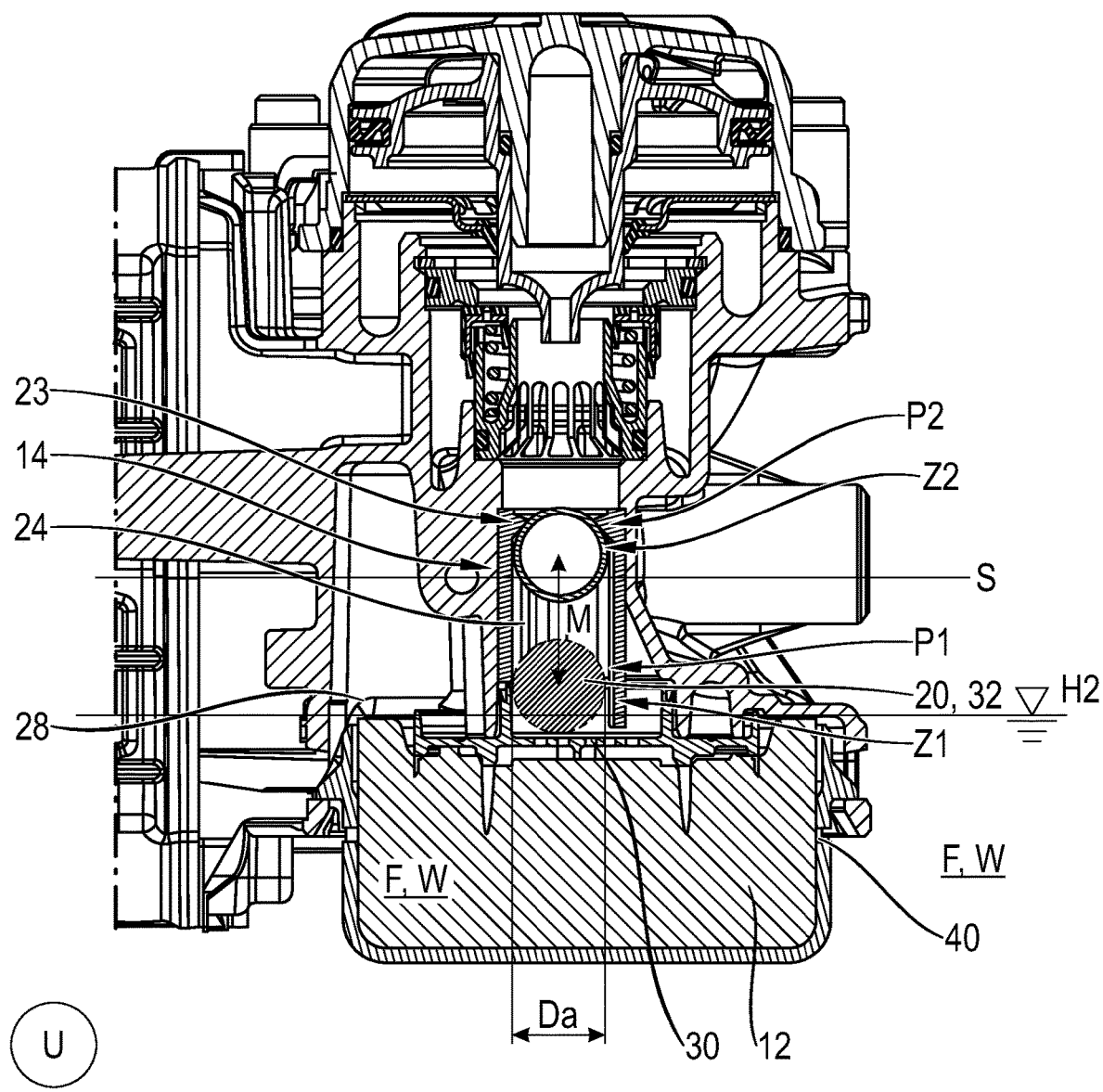
FIG. 2 shows the cross-section from FIG. 1, wherein a first position and a normal state of the sealing member is illustrated by a broken line.

FIGS. 1 and 2 show a pneumatic device 1 having a venting path 10 in an installation situation. The venting path 10 is adapted to vent a pressurized part 16 of the pneumatic device 1. For this purpose, a first volume 12 of the pneumatic device 1 is pneumatically connected via a first compressed-air passage 14 to a pressurized part 16 of the pneumatic device 1. A second compressed-air passage 40 pneumatically connects an external environment U of the pneumatic device 1 to the first volume 12. On venting of the pressurized part 16, compressed air flows from the pressurized part 16 through the first passage 14, through the first volume 12, and then through the second compressed-air passage 40 into the environment U. The flow path of the compressed air so described predominantly follows an outflow direction R1 indicated diagrammatically in FIGS. 1 and 2 by way of an arrow with two bends.

In FIG. 1, a fluid F with fluid level H1 is present in the environment U, so that the entire pneumatic device 1 is arranged below the fluid level H1 and is surrounded by fluid F. The pneumatic device 1 has a threshold value S for the fluid F, which in the exemplary embodiment shown is arranged in the region of the second compressed-air passage 40. Because the second compressed-air passage 40 is arranged beneath the fluid level H1, fluid F could enter the first volume 12 through the compressed-air passage 40. As can be seen in FIG. 1, the fluid level H1 of the fluid F is above the threshold value S. The fluid F therefore fills the first volume 12 completely, and the first compressed-air passage 14, at least to the extent that the fluid F therein exceeds the threshold value S.

FIG. 2 shows the pneumatic device 1 from FIG. 1, wherein in this illustration a fluid F is present in the environment U of the pneumatic device 1 with a second fluid level H2. For reasons of legibility, FIG. 2 is not provided with all the reference numerals that are included in FIG. 1, but it will be appreciated that FIGS. 1 and 2 show the same pneumatic device 1. The fluid level H2 is below the threshold value S but above the second compressed-air passage 40. The fluid F therefore fills the first volume 12 almost completely up to the fluid level H2, while the first compressed-air passage 14 is largely free of fluid F. The threshold value S is thus not reached by the fluid F in the pneumatic device 1.

In the exemplary embodiment of FIGS. 1 and 2, the pneumatic device 1 includes a sealing mechanism 18 which is arranged in the first compressed-air passage 14. The first compressed-air passage 14 shown is in particular a channel-shaped, cylindrical connecting portion between the first volume 12 and the pressurized part 16. In this context, channel-shaped means that the length L of the first compressed-air passage 14 is greater than the diameter D of its cross-section. The outflow direction R1, and the inflow direction R2 explained below, are defined in the region of the first compressed-air passage 14 by the geometry thereof and run therein along the length L. The sealing mechanism 18 shown extends over the entire length L of the first compressed-air passage 14.

The sealing mechanism 18 in FIGS. 1 and 2 further comprises a sealing member 20, a guide 24 for the sealing member 20, and a seal seat 23 provided at an end 26 of the guide 24 that is situated upstream in the outflow direction R1. The sealing member 20 is designed to abut the seal seat 23 in a sealing manner in a sealing state Z2.

In the exemplary embodiment shown, the sealing member 20 is a hollow ball 32 and the guide 24 is a ball cage 34 adapted to the ball 32. The ball 32 is movable along the ball cage 34 between a first position P1 (shown in FIG. 2) and a second position P2 (shown in FIG. 1). The seal seat 23 is formed by a circumferential surface 22 extending around the ball cage 34 in the interior thereof. The circumferential surface 22 largely corresponds to the lateral surface of a truncated cone, and at the end thereof that is situated upstream in the outflow direction R1 there is arranged an edge 21. The seal seat 23 faces downstream in the outflow direction R1, that is to say a normal N to the circumferential surface 22 has at least one component $N_V$ which is parallel to and aligned with the outflow direction R1 (see FIG. 4).

As described above, it is advantageous for reliable operation of the pneumatic device 1 that the fluid F is reliably prevented from entering the pressurized part 16 of the pneumatic device 1. In particular in the case of a first fluid level H1 as in FIG. 1, the fluid F, without appropriate counter-measures, could rise in the inflow direction R2 from the environment U through the first volume 12, through the first compressed-air passage 14, into the pressurized part 16. The inflow direction R2 is shown diagrammatically in FIG. 1 as an arrow running largely parallel to the outflow direction R1.

In order to prevent water from entering the pressurized part 16 in this way, the sealing mechanism 18 is designed to change at least between a normal state Z1 and a sealing state Z2. In FIG. 1, the sealing mechanism 18 is shown in the sealing state Z2, in which the ball 32 is in the second position P2. Position P2 is located at the end 26 of the guide 24 that is situated upstream in the outflow direction R1. In this second position P2, the ball 32 abuts the seal seat 23, specifically the edge 21, in a sealing manner, so that a flow through the first compressed-air passage 14 in the inflow direction R2 is prevented. A closed cavity 33 preferably provided inside the ball 32 reduces the mean density of the ball compared to the density of the material of which the ball 32 is made to such an extent that the ball 32 is capable of floating on the fluid F. Alternatively, a filling material with a low density can be provided, in order to increase the dimensional stability of the ball 32. Because the ball 32 is arranged in the ball cage 34 downstream of the seal seat 23 in the outflow direction R1, the resulting buoyant force $F_A$ presses the ball 32 in a sealing manner against the edge 21 of the seal seat 23. When venting of the pressurized part 16 is carried out in the sealing state Z2, a pushing force $F_P$ on the ball 32 which results from an excess pressure $P_Ü$ in the pressurized part 16 and is oppositely directed to the buoyant force $F_A$ can thus exceed the amount thereof. The ball 32 is thus lifted from the seal seat 23 by the pushing force $F_P$ for the duration of the venting process so that compressed air can be vented from the pressurized part 16 in the outflow direction R1. The ingress of fluid is then prevented by the outflowing air. In the sealing state Z2, a flow can thus pass through the first compressed-air passage 14 only in the outflow direction R1. In other words, the sealing mechanism 18 in the sealing state Z2 performs the function of a check valve and in that state preferably forms such a valve.

It is preferred that the size of the closed cavity 33 in the ball 32 is adapted according to the density of the material of a shell 35 of the ball 32 and the density of the fluid F against which the pressurized part 16 is to be sealed, in order to achieve a mean density which allows the ball 32 to float on the fluid F. It is further preferred that the sealing member 20 is designed, by corresponding adaptation of its mean density, so that the ball 32 lifts from the seal seat 23 at a specific excess pressure $P_Ü$. It is preferred that the material of the ball 32 is matched to the material of the ball cage 34 and/or of the seal seat 23, in order to achieve the desired sealing properties. The ball 32 and the ball cage 34 and/or the seal seat 23 are preferably made either of the same material or of different materials. Suitable materials for the ball 32 and the ball cage 34 and/or the seal seat 23 are, for example, metals such as brass and copper and their alloys, in particular bronze. Likewise suitable are thermoplastic, thermosetting and elastomeric plastics, for example silicones, PTFE, PE, PA, PP and POM, or materials obtained from renewable raw materials, such as rubber or cellulose.

It will be appreciated that a sealing mechanism 18 according to the present invention is not limited to the embodiment shown. For example, in further exemplary embodiments the first compressed-air passage 14 and/or the sealing mechanism 18, other than shown in FIGS. 1 and 2, is not arranged solely vertically. In order for the sealing member 20 to be pressed against the seal seat 23 by the sealing member 20 floating on the fluid F, it is sufficient if the seal seat 23 is oriented so that it points vertically downwards at least in part, that is to say that a normal to a surface of the seal seat 23 has at least one component that is oriented vertically downwards. It is further possible that the sealing mechanism 18, instead of being arranged wholly in the first compressed-air passage 14, is arranged only partially in the first compressed-air passage 14 and/or is arranged at, beneath, or next to the first compressed-air passage 14.

It will further be appreciated that the form of the sealing member 20 is not limited to the ball 32 shown. Thus, further embodiments of the sealing member 20 can have different forms, for example the form of a cylinder, a disk, a cone, a truncated cone, or an ellipsoid. Likewise, the form of the guide 24 is not limited to a linear guide which encloses the sealing member 20, as is shown by the ball cage 34. For example, the guide 24 in further embodiments is of helical form and/or is designed so that the sealing member 20 is guided on or next to the guide 24. It is further conceivable that the guide 24 is not form-fitting, as in the case of the ball cage 34, but is effected by way of a force, for example by magnetic attraction, which biases the sealing member 20 in the direction towards the seal seat 23. It is likewise preferred to combine biasing with a form-fitting guide 24. In particular, it is preferred to bias the ball 32 shown towards the seal seat 23 by way of a biasing element, for example a spring.

Likewise, the sealing member 20 is not limited to having a closed cavity 33 therein in order to be capable of floating on the fluid F. Thus, the sealing member 20 can be made wholly or partially of a material which has a lower density than the fluid F. For example, such a material can be foam, in particular closed-cell foam. It is likewise possible that a closed cavity 33 of a sealing member 20 is filled with a material which has a lower density than the material of the shell 35 of the sealing member 20. It is suitable in particular to fill the cavity 33 with foam or with gas.

In FIG. 2, the fluid level H2 of the fluid F is below the threshold value S. The sealing mechanism 18 is in the normal state Z1, in which the ball 32 is arranged not in the second position P2 but, for example as shown, in the first position P1. This first position P1 of the ball 32 is identified in FIG. 2 by a broken line and is arranged at the end 28 of the guide 24 that is situated downstream in the outflow direction R1. In the normal state Z1, the ball 32 does not abut the seal seat 23; the ball 32 and the seal seat 23 are spaced apart from one another. In this normal state Z1, a flow can pass through the first compressed-air passage 14 both in the outflow direction R1 and in the inflow direction R2.

Because the ball 32 is linearly movable along the guide 24 along the degree of freedom M and is capable of floating on the fluid F, the ball 32 can occupy any intermediate position between the first position P1 and the second position P2 according to a fluid level of the fluid F which is between the second fluid level H2 and the threshold value S.

At the end 28 of the guide 24 that is situated downstream there is preferably provided a stop 30 which prevents the ball 32 from coming out of the guide 24 when the fluid level of the fluid F falls below the depicted fluid level H2. For example, the stop 30, as shown in FIGS. 1 and 2, can be a cup-shaped screen which is designed to prevent particles in the fluid F from entering the first compressed-air passage 14. If such particles reach the region of the seal seat 23, they can impair the proper sealing action of the sealing mechanism 18.

The exemplary embodiment shown is particularly preferred because the sealing mechanism 18, as a result of the ball 32 floating on the fluid F, can be brought into the second position P2, and thus from the normal state Z1 into the sealing state Z2, by the fluid F itself when the fluid level of the fluid F rises above the threshold value S. The exemplary embodiment shown is further particularly preferred because the threshold value S is defined by the combination of the arrangement of the seal seat 23 with the properties of the ball 32, in particular the mean density and the diameter $D_a$ thereof. The threshold value S corresponds to the fluid level of the fluid F in the first volume 12 and/or in the first compressed-air passage 14 at which the ball 32, by floating on the fluid F, comes into contact with the seal seat 23.

In other preferred embodiments, the sealing mechanism 18 is designed to detect by suitable devices, for example sensors, that the fluid F has exceeded the threshold value S and to establish the sealing state Z2 by a suitable mechanism, for example by actuators. In such embodiments, the threshold value S is defined by the position of a sensor and/or of the measuring point of the sensor. In particular, it will be appreciated that the sealing mechanism 18 is not limited to the combination shown of the guide 24, the seal seat 23, and the sealing member 20. Any sealing mechanism which can change between the normal state Z1 and the sealing state Z2 can replace the sealing mechanism 18 shown. Thus, it is possible to use as the sealing mechanism 18 a check valve which can be held in the open position by suitable mechanisms, for example by way of electronic actuators.

The exemplary embodiment shown is also particularly preferred because the elements of the sealing mechanism 18, in particular the ball 32 and the ball cage 34, can be present separately from the pneumatic device 1, wherein it can be possible to retrofit an existing pneumatic device 1 with a sealing mechanism 18 according to the present invention.

In the exemplary embodiment of FIGS. 1 and 2, the pneumatic device 1 is a pneumatic brake system B with a relay valve R, wherein the brake system B is shown in its installation situation in a commercial vehicle. For a more detailed explanation of the features of the brake system B, in particular of the relay valve R, reference may be made to the relevant prior art. It will be appreciated, however, that a pneumatic device according to the present disclosure can be any pneumatic device that has a first compressed-air passage between a first volume and a pressurized part, in particular a pressure-generating system, for example a compressor.

Figure 3:
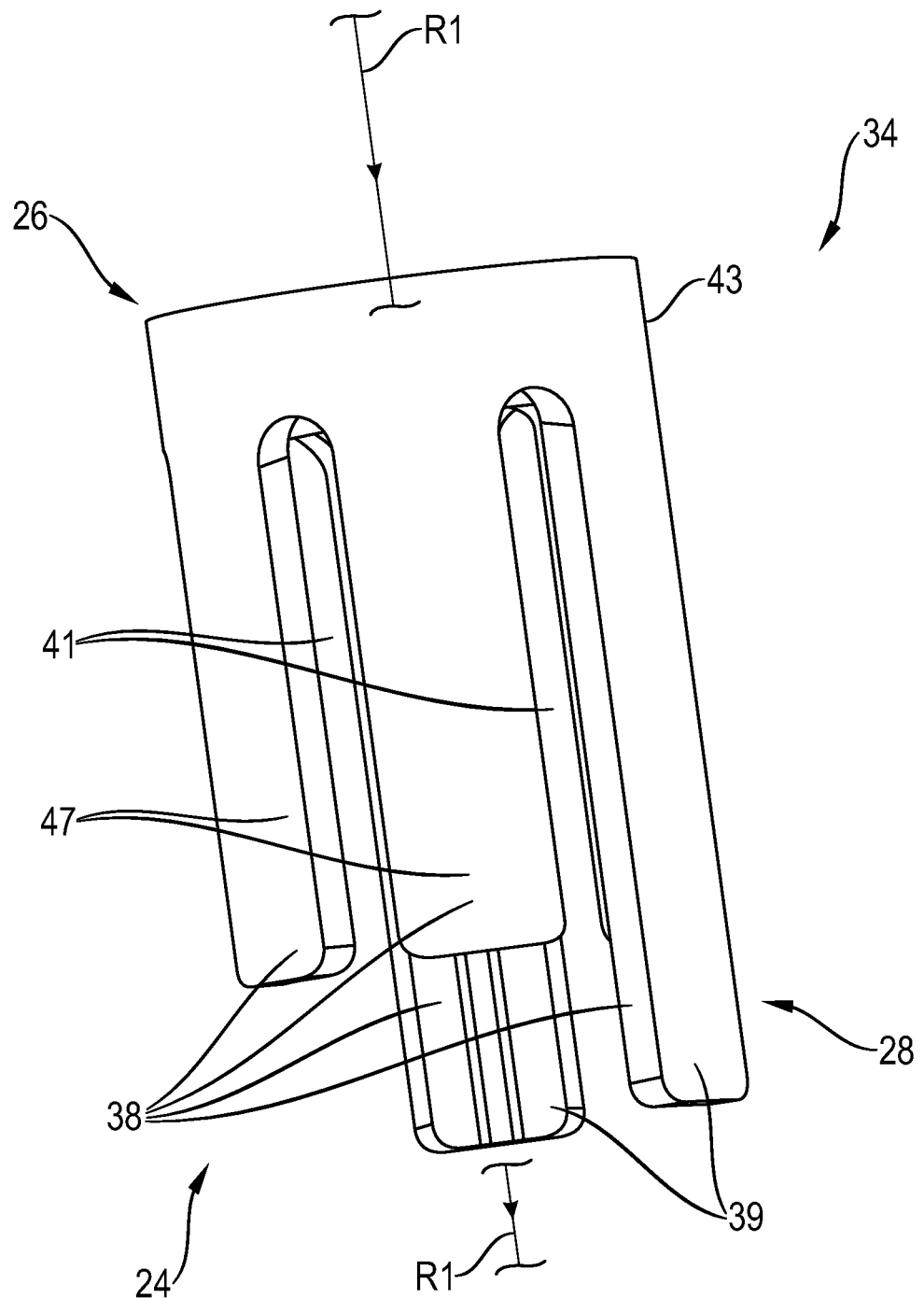
FIG. 3 shows a guide for a sealing member, as can be used in the exemplary embodiment of FIGS. 1 and 2 and in further exemplary embodiments according to aspects of the disclosure.
Figure 4:
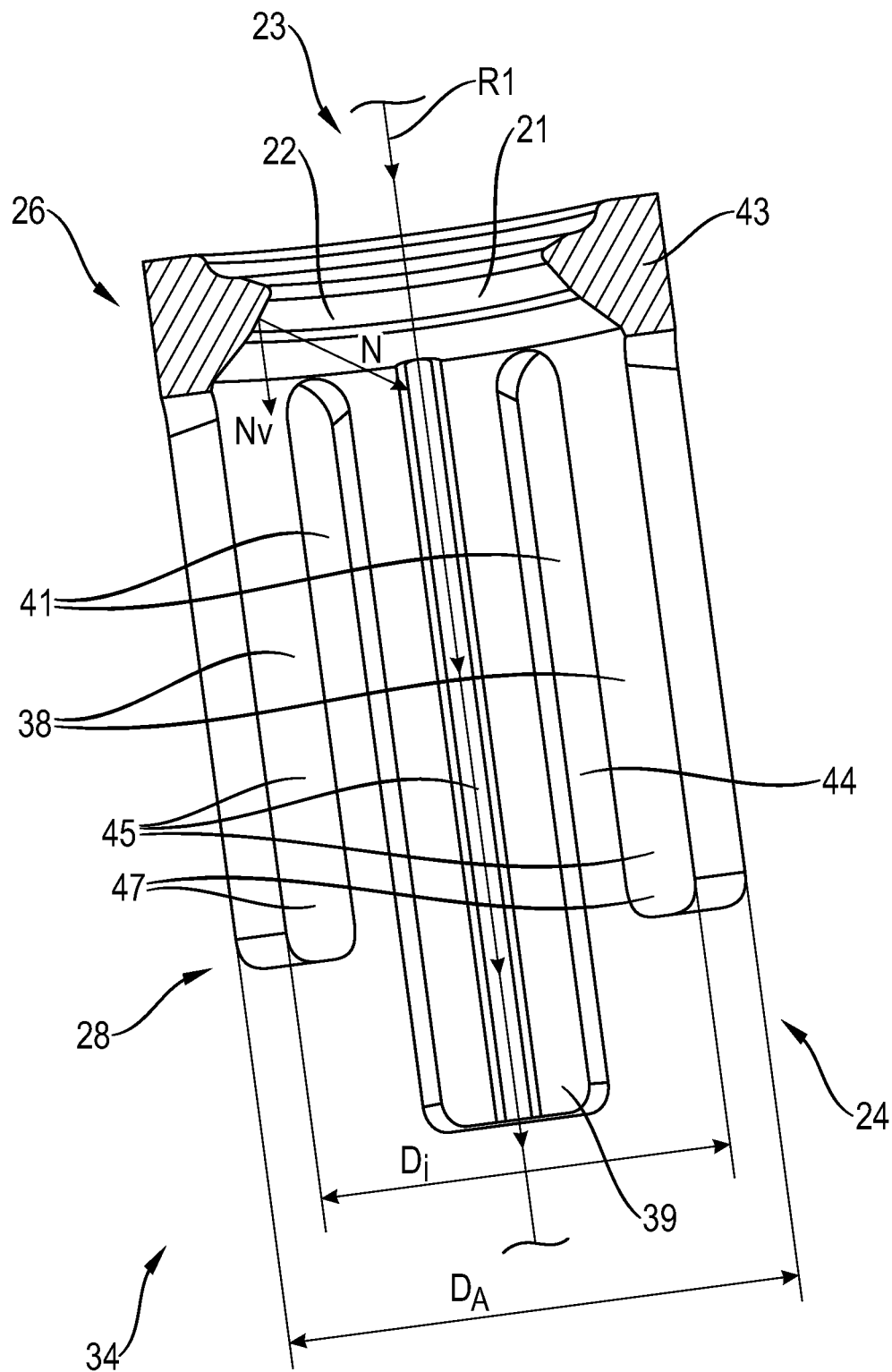
FIG. 4 shows a cross-section of the sealing member according to FIG. 3.

FIGS. 3 and 4 show a ball cage 34 which is used as the guide 24 in the pneumatic device 1 of FIGS. 1 and 2 and which can also be used in further embodiments (not shown) of the pneumatic device 1. FIG. 4 is a sectional view through the ball cage 34, which is shown from outside in FIG. 3. Features which are already shown in FIGS. 1 and 2 have the same reference signs in FIGS. 3 and 4.

The ball cage 34 has a plurality of guide bars 38 extending from the end 26 that is situated upstream in the outflow direction R1. At the end 26 of the ball cage 34 that is situated upstream in the outflow direction R1, the ball cage 34 has a portion 43 which is continuous in the circumferential direction, in which the seal seat 23 with the circumferential surface 22 and the edge 21 is also arranged. The guide bars 38 are arranged on the circumference of the ball cage 34 and are spaced apart from one another in the circumferential direction, so that a largely cylindrical cavity 44 of diameter $D_i$ is arranged in the interior of the ball cage 34. In the cavity 44, the ball 34 is guided in its movement between the first position P1 and the second position P2 by the guide bars 38.

In the circumferential direction, a flow channel 41 is arranged between two mutually spaced apart guide bars 38. The embodiment shown is particularly preferred because it allows an outside diameter $D_a$ of the ball 32 (see FIG. 2) and the diameter $D_i$ of the cavity 44 to be so configured that the ball 32 is guided in the cage 34 both with no or only a small amount of play and with only low friction. At the same time, the flow channels 41 in the ball cage 34 allow the pneumatic device 1 to be vented, wherein the outflowing compressed air flows around the ball 32 by way of the flow channels 41.

In the exemplary embodiment shown (FIGS. 1 to 4), the ball cage 24 is of monolithic form, that is to say the guide bars 38, the continuous portion 43, and the seal seat 23 consist of a cohesive piece. In particular, the monolithic ball cage 24 is made of a single material.

In alternative embodiments, individual portions of the ball cage 24 are manufactured separately and joined together to form the ball cage 24. In particular, it is thus possible to produce the guide bars 38 from a first material which facilitates sliding or rolling of the ball 32 along the guide bars 38, for example PTFE or bronze. At the same time or alternatively, the seal seat 23 consists of a second material which contributes to the sealing action between the seal seat 23 and the ball 32.

It is further possible to coat at least the inwardly facing faces 45 of the guide bars 38 with a material which facilitates sliding or rolling of the ball 32. Likewise, the seal seat 23 can be coated with a material which improves the sealing action.

The outside diameter $D_A$ of the ball cage 34 is adapted to the cross-sectional diameter D of the first compressed-air passage 14 (see FIG. 1), so that the ball cage 34 can preferably be installed in the first compressed-air passage 14 by way of a press-fit.

In the exemplary embodiment shown, the ball cage 34 has elongated guide bars 39 which extend further in the outflow direction R1 than the other, shorter guide bars 47. As is shown in FIG. 1, the inside diameter $D_s$ of the stop 30 is larger than the inside diameter $D_i$ of the ball cage 34, and is arranged non-coaxially with the first compressed-air passage 14, that is to say eccentrically thereto. The ends of the shorter guide bars 47 that are situated downstream in the outflow direction R1 are flush with a side wall 48 of the cup-shaped stop 30. The elongated guide bars 39 extend into an inner region of the cup-shaped stop 30 and are so oriented that they separate off a region 50 of the stop 30 that is not in direct alignment with the inner cavity 44 of the ball cage 34. The ball cage 34 is thus so configured that it prevents the ball 32 from moving to the side into the region 50 of the stop 30. The ball 32 can thus be prevented from canting between the stop 30 and the cage 34 as the fluid level rises and thus possibly being impeded from moving from the first position P1 into the second position P2.

In the exemplary embodiment of the pneumatic device 1, the fluid F against which the pressurized part 16 is to be directed is water W. The mean density of the sealing member 20 is preferably 1000 kg/m³ or less, 900 kg/m³ or less, 800 kg/m³ or less, 700 kg/m³ or less or 600 kg/m³ or less. Preferably, the sealing member 20 has a density which is selected from a range which is defined by a maximum value down to 0 kg/m³, wherein the maximum value is included in the range. The maximum value is particularly preferably any desired value from 1000 kg/m³ to 0.01 kg/m³.

LIST OF REFERENCE SIGNS (PART OF THE DESCRIPTION)

1 pneumatic device
10 venting path
12 first volume, through which a flow can pass
14 first compressed-air passage
16 pressurized part
18 sealing mechanism
20 sealing member
21 edge
22 circumferential surface
23 seal seat
24 guide
26 end situated upstream in the outflow direction R1
28 end situated downstream in the outflow direction R1
30 cup-shaped screen, stop
32 ball
34 ball cage
35 (ball) shell
38 guide bar
39 elongated guide bar
40 second compressed-air passage
41 flow channel 43 continuous portion
44 inner cavity
45 inwardly facing face
47 shorter guide bar
48 side wall
50 region not in direct alignment with the inner cavity 44
52 valve plate
54 control piston
B pneumatic brake system
D cross-sectional diameter of the first compressed-air passage 14
$D_A$ outside diameter of the ball cage 34
$D_a$ outside diameter of the ball 32
$D_i$ inside diameter of the cavity 44
$D_s$ inside diameter of the cup-shaped stop 30
F fluid
$F_A$ buoyant force
$F_P$ pushing force
H1 first fluid level
H2 second fluid level
L length of the first compressed-air passage 14
N normal vector
$N_V$ vertical component of the normal vector N
$P_Ü$ excess pressure
P1 first position
P2 second position
R relay valve
R1 outflow direction
R2 inflow direction
S threshold value
U environment
W water
Z1 normal state
Z2 sealing state

What is claimed is:

1. A brake valve (1) comprising:
    at least one venting path (10) for venting the brake valve (1) in an outflow direction (R1), wherein the venting path (10) comprises:
        a first volume (12), through which a flow can pass;
        a first compressed-air passage (14) pneumatically connecting the first volume (12) to a pressurized part (16) of the brake valve (1);
        a sealing mechanism (18) that changes at least between a normal state (Z1) and a sealing state (Z2);
        wherein in the normal state (Z1) of the sealing mechanism (18) a flow passes through the first compressed-air passage (14) both in the outflow direction (R1) and in an oppositely directed inflow direction (R2), and
    wherein in the sealing state (Z2) of the sealing mechanism (18) a flow passes through the first compressed-air passage (14) only in the outflow direction (R1).

2. The brake valve (1) as claimed in claim 1, wherein the sealing mechanism (18) changes from the normal state (Z1) into the sealing state (Z2) when a fluid (F) in the first volume (12) and/or in the first compressed-air passage (14) exceeds a threshold value(S).

3. The brake valve (1) as claimed in claim 2, wherein the fluid (F) is water (W) and the threshold value is a height of the water.

4. The brake valve (1) as claimed in claim 1, wherein the sealing mechanism (18) is arranged in the first compressed-air passage (14).

5. The brake valve (1) as claimed in claim 1, wherein the sealing mechanism (18) comprises a sealing member (20) and a seal seat (23), wherein the sealing member (20) abuts the seal seat (23) in a sealing manner in the sealing state (Z2).

6. The brake valve (1) as claimed in claim 5, wherein the sealing member (20) floats on water (W).

7. The brake valve (1) as claimed in claim 5, wherein the sealing member (20) has a mean density of 900 kg/m³ or less.

8. The brake valve (1) as claimed in claim 5, wherein the seal seat (23) points downstream in the outflow direction (R1), and wherein the sealing member (20) is arranged downstream of the seal seat (23) in the outflow direction (R1).

9. The brake valve (1) as claimed in claim 5, wherein the sealing member (20) is movable between a first position (P1) and a second position (P2), wherein the sealing member occupies the first position (P1) in the normal state (Z1) and the second position (P2) in the sealing state (Z2).

10. The brake valve (1) as claimed in claim 9, wherein the first position (P1) is downstream of the second position (P2) in the outflow direction (R1).

11. The brake valve (1) as claimed in claim 9, wherein the sealing mechanism (18) includes a guide (24) for the sealing member (20), wherein the sealing member (20) moves between the first position (P1) and the second position (P2) along the guide (24), wherein the seal seat is situated at an upstream end (26) of the guide (24) in the outflow direction (R1).

12. The brake valve (1) as claimed in claim 11, wherein the guide (24) includes a stop (30) that prevents the sealing member (20) from coming out of the guide (24), wherein the stop (30) is disposed at a downstream end (28) of the guide (24) in the outflow direction (R1).

13. The brake valve (1) as claimed in claim 11, wherein the sealing member (20) is a ball (32) and the guide (24) is a ball cage (34).

14. The brake valve (1) as claimed in claim 13, wherein the ball cage (34) includes a plurality of guide bars (38) extending in the outflow direction (R1), wherein the guide bars define openings therebetween, such that fluid communication is provided in a lateral direction through the openings.

15. The brake valve (1) as claimed in claim 1, wherein the first compressed-air passage (14) has a cross-sectional width with dimensions that are smaller than a length of the compressed-air passage defined in the outflow direction.

16. The brake valve (1) as claimed in claim 1, wherein the first compressed-air passage (14) is arranged vertically at least in some portions in an installation situation of the brake valve (1).

17. The brake valve (1) as claimed in claim 16, wherein the pressurized part (16) of the brake valve (1) is arranged above the first volume (12) in an installation situation of the brake valve (1).

18. The brake valve (1) as claimed in claim 1, wherein the venting path (10) further comprises a second compressed-air passage (40) pneumatically connecting the first volume (12) to an external environment (U) of the brake valve (1).

19. The brake valve (1) as claimed in claim 1, wherein the brake valve (1) is a relay valve (R).

20. A method for installing the brake valve (1) as claimed in claim 1, wherein the method comprises:
    arranging the sealing mechanism (18) in the first compressed-air passage (14) of the brake valve (1);
    wherein the sealing mechanism (18) is arranged in the first compressed-air passage (14) between the first volume (12) and the pressurized part (16) and arranged to be able to change at least between the normal state (Z1) and the sealing state (Z2);
    wherein in the normal state (Z1) a flow can pass through the first compressed-air passage (14) both in an outflow direction (R1) and in an oppositely directed inflow direction (R2); and wherein in the sealing state (Z2) a flow can pass through the first compressed-air passage (14) only in the outflow direction (R1);
    wherein the sealing mechanism (18) is a separate structural unit configured for installation or retrofitting in existing brake valves as a separate sealing mechanism.

21. The brake valve (1) as claimed in claim 1, wherein the first volume (12) is disposed downstream from the sealing mechanism (8) when the sealing mechanism (18) is in the normal state, wherein the first volume has a greater cross-section width in the outflow direction than the first compressed air passage at an interface therebetween.

22. The brake valve (1) as claimed in claim 21, wherein a second compressed-air passage (40) is disposed downstream from the first volume (12) and pneumatically connects the first volume (12) to an external environment (U) of the brake valve, wherein the second air passage has a smaller cross-sectional width in the outflow direction than the first volume at an interface therebetween.

23. A method for preventing fluid from entering a pressurized part (16) of a brake valve (1) in an inflow direction (R2), the brake valve having at least one venting path (10), the venting path (10) including a first volume (12), through which a flow can pass, a first compressed-air passage (14) pneumatically connecting the first volume (12) to a pressurized part (16) of the brake valve (1), and a sealing mechanism (18);
    wherein the method comprises:
        providing fluid (F) above a threshold value(S) in the first volume (12) and/or in the first compressed-air passage (14) of the brake valve (1);
        bringing the sealing mechanism (18) from a normal state (Z1) into a sealing state (Z2);
        wherein in the normal state (Z2) a flow passes through the first compressed-air passage (14), which pneumatically connects the first volume (12) to the pressurized part (16) of the brake valve (1), both in the inflow direction (R2) and in an oppositely directed outflow direction (R1);
        and wherein in the sealing state (Z2) a flow passes through the first compressed-air passage (14) only in the outflow direction (R1).

24. The method as claimed in claim 23, wherein the fluid (F) brings the sealing mechanism (18) into the sealing state (Z2) by exceeding the threshold value(S) in the first volume (12).

25. The method as claimed in claim 24, further comprising:
    venting the pressurized part (16) of the brake valve (1) in the outflow direction (R1) in both the normal state and the sealing state.

26. The method as claimed in claim 23, further comprising using a ball (32) to establish the sealing state (Z2) of the brake valve (1), starting from the normal state (Z1) of the brake valve (1), wherein the sealing state (Z2) prevents fluid (W) from entering the pressurized part (16) of the brake valve (1), when the fluid (F) in the first volume and/or in the first compressed-air passage (12) exceeds the threshold value(S).

* * * * *